United States Patent [19]

Carey, II et al.

[11] Patent Number: 5,470,667
[45] Date of Patent: * Nov. 28, 1995

[54] COATED METAL STRIP

[75] Inventors: Jay F. Carey, II, Follansbee, W. Va.;
Mehrooz Zamanzadeh, Pittsburgh, Pa.

[73] Assignee: The Louis Berkman Company, Steubenville, Ohio

[*] Notice: The portion of the term of this patent subsequent to Mar. 28, 2012, has been disclaimed.

[21] Appl. No.: 338,386

[22] Filed: Nov. 14, 1994

Related U.S. Application Data

[63] Continuation of Ser. No. 175,523, Dec. 30, 1993, Pat. No. 5,401,586, which is a continuation-in-part of Ser. No. 154,376, Nov. 17, 1993, abandoned, which is a continuation of Ser. No. 42,649, Apr. 5, 1993, abandoned.

[51] Int. Cl.$^6$ ................................................. B32B 15/18
[52] U.S. Cl. .................... 428/659; 428/658; 428/685; 428/939
[58] Field of Search ....................... 428/658, 659, 428/935, 939, 646–648, 650, 674, 685; 427/433; 148/242

[56] References Cited

U.S. PATENT DOCUMENTS

| | | | |
|---|---|---|---|
| 84,206 | 11/1868 | Mills | 428/648 |
| 1,156,169 | 10/1915 | Monnot | 428/658 |
| 1,989,925 | 2/1935 | Hoover | 148/6 |
| 2,210,593 | 11/1940 | McCullough | 75/175 |
| 2,258,327 | 10/1941 | Kramer | 29/181 |
| 2,374,926 | 5/1945 | Fink | 117/51 |
| 2,533,048 | 12/1950 | Rodgers | 117/52 |
| 2,703,766 | 3/1955 | Ellis | 117/114 |
| 2,806,622 | 9/1957 | Leirer | 220/5 |
| 3,012,310 | 12/1961 | Godfrey | 29/196.4 |
| 3,058,856 | 10/1962 | Miller | 148/16 |
| 3,231,127 | 1/1966 | Virzi | 220/52 |
| 3,630,792 | 12/1971 | Smyth | 148/6.3 |
| 3,791,801 | 2/1974 | Ariga et al. | 29/196.5 |
| 3,962,501 | 6/1976 | Ohbu et al. | 427/433 |
| 3,966,564 | 6/1976 | Hyner et al. | 204/43 |
| 4,015,1950 | 4/1977 | Galland et al. | 428/648 |
| 4,049,481 | 9/1977 | Morisaki | 156/151 |
| 4,177,326 | 12/1979 | Windal et al. | 428/645 |
| 4,184,928 | 1/1980 | Hoije | 204/43 |

(List continued on next page.)

FOREIGN PATENT DOCUMENTS

| | | |
|---|---|---|
| 0480122 | 9/1990 | European Pat. Off. . |
| 746337 | 5/1933 | France . |
| 1457769 | 9/1966 | France . |
| 2052324 | 3/1971 | France . |
| 2281995 | 8/1974 | France . |
| 2554831 | 11/1983 | France . |
| 2713196 | 10/1978 | Germany . |
| 42-18219 | 9/1967 | Japan . |
| 49-54230 | 5/1974 | Japan . |
| 58-48694 | 3/1983 | Japan . |
| 59-41430 | 3/1984 | Japan .................... 420/557 |
| 59-96238 | 6/1984 | Japan .................... 420/557 |
| 60-208465 | 10/1985 | Japan . |
| 528558 | 10/1932 | United Kingdom . |
| 546179 | 1/1942 | United Kingdom .................. 420/557 |
| 581604 | 10/1946 | United Kingdom . |
| 796128 | 6/1958 | United Kingdom . |
| 1008316 | 10/1965 | United Kingdom . |
| 1040916 | 9/1966 | United Kingdom . |
| 1074852 | 7/1967 | United Kingdom . |
| 1178816 | 1/1970 | United Kingdom . |
| 1194751 | 6/1970 | United Kingdom . |
| 1277523 | 6/1972 | United Kingdom . |
| 1439774 | 6/1976 | United Kingdom . |
| 2005307 | 9/1977 | United Kingdom . |
| 1513002 | 6/1978 | United Kingdom . |
| 1517454 | 7/1978 | United Kingdom . |
| 2055158 | 2/1981 | United Kingdom . |
| 1588808 | 4/1981 | United Kingdom . |
| 2099857 | 1/1982 | United Kingdom . |
| 2117414 | 10/1983 | United Kingdom . |
| 2265389 | 9/1993 | United Kingdom . |
| 2276887 | 10/1994 | United Kingdom . |

OTHER PUBLICATIONS

Great Britain Search Report, Dated May 22, 1995, for application No. GB 9504/12.2.

English Translation of Kokai Patent Application No. SHO 49(1974) 54230, May 27, 1974.

"Properties and Selection: Nonferrous Alloys and Special–Purpose Materials", Metals Handbook, 10th Ed., vol. 2, pp. 1166–1168, Oct. 1990.

Standard Specification for Solder Metal; pp. 1 & 9, Nov. 1986.

*Metals Handbook*, The American Society for Metals, "Metallic Coatings", pp. 703–721; Surface Treatments pp. 725–732; Tin and Tin Alloys, pp. 1063–1076; Zinc and Zinc Alloys pp. 1077–1092, No Month 1983.

Van Nostrand's Scientific Encyclopedia, 6th Edition, vol. 1, 1983; pp. 94–96–Definition of "Alloys"; p. 1322–Definition of Galvanizing, No Month.

Van Nostrand's Scientific Encyclopedia, 6th Edition, vol. II, 1983, pp. 2832–2834–Definition of "Tin"; pp. 3059–3062–Definition of Zinc, No Month.

McGraw–Hill Encyclopedia of Science & Technology, 6th Edition, 1987, p. 517 No Month.

McGraw–Hill Encyclopedia of Science & Technology, 6th Edition, 1987, pp. 35–37; pp. 44–46, No Month.

McGraw–Hill Encyclopedia of Science & Technology, 6th Edition, 1987, pp. 368–372 No Month.

(List continued on next page.)

*Primary Examiner*—John Zimmerman
*Attorney, Agent, or Firm*—Vickers Daniels & Young

[57] ABSTRACT

A corrosion-resistant colored architectural material which is essentially lead free and is not highly reflective. The coating on the material is a two-phase metallic coating comprised of a large weight percentage of zinc and a relatively large weight percentage of tin. The tin-zinc composition provides for both a highly corrosive-resistant coating which protects the surface of the architectural material from oxidation and also produces a gray, earth tone colored which is not highly reflective.

31 Claims, No Drawings

U.S. PATENT DOCUMENTS

| | | | |
|---|---|---|---|
| 4,190,504 | 2/1980 | Usui | 204/35 |
| 4,202,921 | 5/1980 | Enghag | 427/406 |
| 4,321,289 | 3/1982 | Bartsch | 427/287 |
| 4,357,027 | 11/1982 | Zeitlow | 280/5 |
| 4,758,407 | 7/1988 | Ballentine et al. | 420/560 |
| 4,778,733 | 10/1988 | Lubrano et al. | 428/647 |
| 4,806,309 | 2/1989 | Tulman | 420/562 |
| 4,814,049 | 3/1989 | Helton et al. | 204/44.2 |
| 4,879,096 | 11/1989 | Naton | 420/561 |
| 4,969,980 | 11/1990 | Yoshioka et al. | 204/28 |
| 4,999,258 | 3/1991 | Wake et al. | 428/632 |
| 5,114,799 | 5/1992 | Ohashi et al. | 428/659 |
| 5,203,985 | 4/1993 | Nishimura et al. | 205/193 |
| 5,314,758 | 5/1994 | Carey, II et al. | 428/648 |
| 5,354,624 | 10/1994 | Carey, II | 428/647 |
| 5,401,586 | 3/1995 | Carey et al. | 428/659 |

OTHER PUBLICATIONS

McGraw–Hill Encyclopedia of Science & Technology, 6th Edition, 1987, pp. 618–623 No Month.

Abstract of Great Britain Patent 2,055,158, Aug. 1983.

Galvinizing, p. 1322, Van Nostrands Scientific Encyclopedia, Sixth Edition, No Date.

Metal Coatings, p. 35, McGraw–Hill Encyclopedia of Scient. & Technology, Sixth Edition, vol. II, No Date.

Robert J. Nekervis et al, Tinning of Steel, pp. 709–712, American Society for Metals–Metals Handbook, No Date.

W. M. Pierce, Zinc Coatings, pp. 712–714, American Society for Metals–Metals Handbook, No Date.

Erwin Vogelsang et al, Tin & Tin Alloys, pp. 1063–1070, American Society for Metals–Metals Handbook, No Date.

R. K. Waring et al, Zinc & Zinc Alloys, pp. 1077–1086, American Society for Metals–Metals Handbook, No Date.

Materials & Methods, Tin–Zinc Alloy Coatings, (from "Tin", Jul. 1946, pp. 9–10) pp. 1248, 1250.

Higuchi, et al, "Sn–Zn Alloy Electroplated Steel Sheet for Container of Alcohol Fuel or Alcohol–Containing Fuel", Translation of Kokai 58–48690, 1983, 11 pages.

Federal Specification QQ–T–201F, 12 Nov. 1986, "Terne Plate, for Roofing and Roofing Products", pp. 1–8.

"Hot Dip Tin Coatings of Steel and Cast Iron" Metals Handbook, 9th Ed. vol. 5, 1983, pp. 351–355.

French Search Report dated Dec. 5, 1994.

COATED METAL STRIP

This patent application is a continuation of patent application Ser. No. 175,523 filed Dec. 30, 1993 and issued to U.S. Pat. No. 5,401,586 on Mar. 28, 1995 which is in turn a continuation-in-part of abandoned patent application Ser. No. 154,376 filed Nov. 17, 1993 which is in turn a continuation of abandoned patent application Ser. No. 042,649 filed Apr. 5, 1993.

The present invention relates to the art of metal architectural materials and more particularly to an architectural sheet material that is environmentally friendly while providing long life and desired colorization.

Incorporation By Reference

As background material, so that the specification need not specify in detail what is known in the art, Assignees' U.S. Pat. Nos. 4,987,716 and 4,934,120 illustrate metal roofing systems of the type to which this invention can be used and are incorporated herein by reference. U.S. patent application Ser. No. 000,101 filed Jan. 4, 1993, illustrating a process of hot-dip coating roofing materials, is also incorporated herein by reference.

BACKGROUND OF THE INVENTION

Over the years, architectural materials, such as metal roofing systems and metal siding systems, made of pliable metals in various sheet gauge thicknesses have been used. Metals such as carbon steel, stainless steel, copper and aluminum are the most popular types of metal. These architectural metal materials are commonly treated with corrosion-resistant coatings to prevent rapid oxidation of the metal surface, thereby extending the life of the materials. A popular corrosion-resistant coating for carbon steel and stainless steel is a terne coating. Terne coating has been the predominate and most popular coating for roofing materials due to its relatively low cost, ease of application, excellent corrosion-resistant properties and desirable colorization during weathering. The terne coating is an alloy typically containing about 80% lead and the remainder tin. The coating is generally applied to the architectural materials by a hot-dip process wherein the material is immersed into a molten bath of terne metal. Although terne coated sheet metals have exhibited excellent resistant properties and have been used in a variety of applications, the terne coating has been questioned in relation to its impact on the environment. Environmental and public safety laws have been recently proposed and/or passed prohibiting the use of materials containing lead. Because the terne alloy contains a very high percentage of lead, materials coated with terne have been prohibited in various types of usages or applications such as aquifer roofing systems. The concern of lead possibly leaching from the terne coating has made such coated materials inadequate and/or undesirable for several types of building applications. The terne alloy has a further disadvantage in that the newly applied terne is very shiny and highly reflective. As a result, the highly-reflective coating cannot be used on buildings or roofing systems such as at airports and military establishments. The terne coating eventually loses its highly-reflective properties as the components within the terne coating are reduced (weathered); however, the desired amount of reduction takes approximately 1½ to 2 years when the terne coating is exposed to the atmosphere, thus requiring the terne metals to be stored over long periods of time prior to being used in these special areas. The storage time is significantly prolonged if the terne-coated materials are stored in rolls and the rolls are protected from the atmosphere.

Tin coating of carbon steel is a well-known process for use in the food industry. However, in the specialized art of architectural materials, a tin coating for architectural materials has not been used until done by the present inventors. The most popular process for applying a tin coating to carbon steel for use in the food industry is by an electrolysis process. In an electrolysis process, the coating thickness is very thin and typically ranges between $3.8 \times 10^{-4}$ to $20.7 \times 10^{-4}$ mm ($1.5 \times 10^{-5}$ to $8.15 \times 10^{-5}$ in.). Furthermore, the equipment and materials needed to properly electroplate the metal materials are very expensive and relatively complex to use. The expense of applying an electroplated-tin coating and the limited obtainable thicknesses of the tin coating are a disadvantage for using such a process for building and roofing materials. A hot-dip process for applying the tin coating may be used; however, if the architectural materials are not properly prepared and the coating is not properly applied to the roofing materials, minute areas of discontinuity in the tin coating may occur resulting in non-uniform corrosion protection. This is especially a problem when the tin is applied to stainless steel materials by a hot-dip process. Tin is not electroprotective to steel under oxidizing conditions. Consequently, discontinuities in the tin coating result in the corrosion of the exposed metal. Tin coatings have the further disadvantage of having a highly-reflective surface. As a result, architectural materials coated with a tin coating cannot be used in an environment where highly-reflective materials are undesirable until the coated materials are further treated (i.e. painted) or the tin is allowed time to oxidize.

Coating architectural materials with zinc metal, commonly known as galvanization, is another popular metal treatment to inhibit corrosion. Zinc is a highly desirable metal to coat architectural materials with because of its relatively low cost, ease of application (i.e. hot-dip application) and excellent corrosion resistance. Zinc is also electroprotective to steel under oxidizing conditions and prevents the exposed metal, due to discontinuities in the zinc coating, from corroding. This electrolytic protection extends away from the zinc coating over exposed metal surfaces for a sufficient distance to protect the exposed metal at cut edges, scratches, and other coating discontinuities. With all of the advantages of using zinc, zinc coatings have several disadvantages that make it undesirable for many types of building applications. Although zinc coatings will bond to many types of metals, the formed bond is not strong and can result in the zinc coating flaking off the building materials. Zinc is also a very rigid and brittle metal and tends to crack and/or flake off when the building materials are formed on site, i.e. press fitting of roofing materials.

Due to the various environmental concerns and problems associated with corrosion-resistant coatings applied to metal architectural materials, there has been a demand for a coating which can be easily and successfully applied to materials that protect the materials from corrosion, does not have a highly-reflective surface subsequent to application

SUMMARY OF THE INVENTION

The present invention relates to a corrosion-resistant coating formulation for use on architectural materials wherein the coating is environmentally friendly, has a low lead content and quickly weathers to a non highly-reflective desirable surface.

In accordance with the principal feature of the invention, there is provided an architectural material typically of stainless steel or carbon steel coated with a tin-zinc alloy. The tin-zinc coating is a two-phase metal coating comprising a large weight percentage of zinc and a relatively large weight percentage of tin. The tin content of the two-phase coating is less than 35 weight percent and the zinc content is at least 65 weight percent. The unique tin-zinc combination provides for both a corrosion-resistant coating that protects the surface of the architectural material from oxidation and also forms a gray surface, which is very similar to weathered terne, and which is also not highly reflective.

In accordance with another aspect of the present invention, the tin-zinc coating is applied to the metal roofing materials by a hot-dip process. If the tin-zinc coating is to be applied to stainless steel architectural materials, the coating is preferably applied to the roofing materials in similar fashion as disclosed in Assignees' application Ser. No. 000,101 filed on Jan. 4, 1993 and incorporated herein. "Stainless steel" in the application means a large variety of alloy metals containing chromium and iron. The alloy may also contain other elements such as nickel, carbon, molybdenum, silicon, manganese, titanium, boron, copper, aluminum, nitrogen and various other metals or compounds. Elements such as nickel can be flashed (electroplated) onto the surface of the chromium-iron alloy or directly incorporated into the chromium-iron alloy. The hot dip process disclosed in Ser. No. 000,101 must be slightly modified to accommodate the higher temperatures necessary to hot-dip coat the tin-zinc coating. Tin melts at 232° C. (450° F.) and lead melts at 328° C. (622° F.). In the hot dip process of Ser. No. 000,101, the coating metal has a large amount of tin thus causing the melting temperature of the coating to be close to 232° C. (450° F.). In the present invention, the zinc component of the metal coating is the largest component. Zinc melts at 420° C. (788° F.). As a result, the melting point of the tin-zinc coating approaches 420° C. which is a significantly higher temperature than which was used in the process disclosed in Ser. No. 000,101. To accommodate for the higher temperatures, the coating vat may have to be made of a material which can withstand the higher temperatures. Furthermore, the time for cooling the tin-zinc coating may have to be increased. Other than these modifications, the process disclosed in Ser. No. 000,101 is used to coat the novel tin-zinc coating onto stainless steel. The hot-dip process disclosed in Serial No. 000,101 can be used to coat architectural materials made of metals other than stainless steel such as carbon steel, aluminum, copper, bronze, etc.

In accordance with another aspect of the invention, bismuth and antimony may be added to the tin-zinc coating to inhibit the crystallization of the tin in cold weather. When tin crystallizes, the bonding of the tin-zinc coating to the roofing materials may weaken resulting in flaking of the coating. The addition of small amounts of bismuth and/or antimony prevents such crystallization of the tin. Bismuth or zinc may be added in larger quantities to also enhance the hardness and strength of the tin-zinc coating to increase the resistance to wear of the coating.

In accordance with another feature of the present invention, the tin-zinc coating is essentially lead free. The lead content is maintained at extremely low levels not exceeding 0.05 weight percent. Preferably, the lead content is maintained at much lower weight percentage levels so as to dispense with any environmental concerns associated with the tin-zinc coating.

In accordance with yet another feature of the present invention, the tin-zinc coating composition is such that the coating provides excellent corrosion resistance and the coated materials can be formed on site without the tin-zinc coating cracking and/or flaking off. The amount of zinc in the tin-zinc coating is controlled such that the coating does not become too rigid and brittle.

In accordance with still another aspect of the present invention, the metallic roofing materials are plated with a nickel barrier prior to applying the tin-zinc coating to provide additional corrosion resistance, especially against halogens such as chlorine. The nickel barrier is applied to the metal building materials at a thin layer. Although the tin-zinc coating provides excellent protection against most f these corrosion-producing elements and compounds, compounds such as chlorine have the ability to eventually penetrate the tin-zinc coating and attack and oxidize the surface of the metallic building materials thereby weakening the bond between the roofing material and the tin-zinc coating. The nickel barrier has been found to provide an almost impenetrable barrier to these elements and/or compounds which in fact penetrate the tin-zinc coating. Due to the very small amount of these compounds penetrating the tin-zinc coating, the thickness of the nickel barrier can be maintained at thin thicknesses while still maintaining the ability to prevent these components from attacking the metal roofing material. The tin-zinc coating and thin nickel coating effectively complement one another to provide superior corrosion resistance.

The primary object of the present invention is the provision of an architectural material coated with a metallic coating which is highly corrosive resistant.

Another object of the present invention is the provision of an architectural material treated with a metallic coating that is not highly reflective.

Yet another object of the present invention is a metallic coating, as defined above, which is a two-phase system comprised of tin and zinc.

Yet another object of the present invention is the provision of a roofing material having a tin-zinc metallic coating which is essentially lead free.

Still yet another object of the present invention is to provide a two-phase, tin-zinc metallic coating applied to a base metal sheet which coated sheet can be formed and sheared to form various building and roofing components that can be subsequently assembled on site without the metallic coating flaking off, chipping, and/or cracking.

Still another object of the present invention is the provision of providing a tin-zinc coated roofing material which can be preformed into roof pans and subsequently seamed on site either by pressed seams or soldered seams into waterproof joints.

Another object of the present invention is the provision of applying a thin nickel barrier to the surface of the roofing material prior to applying the tin-zinc coating.

These and other objects and advantages will become apparent to those skilled in the art upon reading of the detailed description of the invention set forth below.

DESCRIPTION OF THE PREFERRED EMBODIMENT

The tin-zinc coating is a two-phase metallic coating which, when applied to stainless steel or low carbon steel materials, forms a highly corrosion-resistant coating that reduces the corrosion of the materials when exposed to the atmosphere. The tin-zinc coating contains a large weight percentage of zinc and essentially the balance of tin. It has been discovered that by adding zinc in the amounts of at least 65 weight percent of the tin-zinc alloy, the corrosion resistance of the two-phase metallic coating is significantly increased as compared to a protective coating essentially composed of tin. Although the exact reasons for this physical phenomenon of increased corrosion resistance due to the addition of zinc to tin is unknown to the inventors, it has been found that by adding zinc to tin, the two-phase metallic coating exhibits corrosive-resistant properties which exceed that of tin coatings and, in some environments, that of a terne coating. The tin-zinc coating is electroprotective under oxidizing conditions which inhibits oxidation of exposed metal near the tin-zinc coating. As a result, minor discontinuities in the tin-zinc coating do not result in oxidation of the exposed metal, a contrary result if only a tin coating is used. The tin-zinc coating may contain small amounts of other metals to modify the physical properties of the tin-zinc, two-phase metallic coating; however, these secondary metal components contribute primarily to the strength of the coating and not to the corrosion-resistant properties of the coating. The tin-zinc coating can be applied to both stainless steel and carbon steel materials by preferably using a conventional hot-dipping process; however, the coating may be applied by other means such as by electroplating, an airknife process, etc. The tin-zinc coating is not limited to only the protection of stainless steel and carbon steel and may also be applied to other metals such as copper, bronze, tin, titanium, etc.

The large zinc content of the two-phase metallic tin-zinc coating has not been previously used, especially on architectural materials such as metallic building and roofing materials. The bonding of the tin-zinc coating to carbon steel and stainless steel roofing materials is surprisingly strong and forms a durable protective coating which is not easily removable, thereby resisting flaking of the coating. The surfaces of the metallic roofing and building materials may be pretreated prior to the coating to improve the bonding between the tin-zinc coating and the surface of the metallic roofing material. For stainless steel materials, pickling the surface of the stainless steel provides for significantly greater bonding of the coating. Preferably, the pickling process disclosed in Assignees' application Ser. No. 000,101 is used to maximize the bonding of the tin-zinc coating to the stainless steel materials.

The life of the architectural material is significantly extended by coating the material with the tin-zinc metallic coating. The tin-zinc coating acts as a barrier to the atmosphere which prevents the metallic coating from oxidizing and/or reducing in the presence of oxygen, carbon dioxide or other reducing agents in the environment. Although the tin-zinc coating oxidizes in the presence of various reducing agents in the atmosphere, the rate of oxidation is significantly slower than that of the architectural materials. Furthermore, the tin and zinc oxide which forms on the coating surface provides corrosion resistance to the tin-zinc coating itself which further enhances the corrosion protection provided by the tin-zinc coating. The tin-zinc oxides also reduce the reflectivity of the tin-zinc coating and color the tin-zinc coating. Terne coated materials have become very popular since terne coated materials eventually weather and turn a grey, earth tone color. The inventors discovered that the novel tin-zinc formulations forms a colored coating which closely matches the popular grey, earth tone color of weathered terne. Furthermore, by coating the building materials with the tin-zinc coating, the usable life of the materials is extended typically beyond the life of the structure the coated materials are used on due to the corrosion-resistance of the tin-zinc coating.

The tin-zinc coating is primarily composed of tin and zinc and contains little, if any, lead thus making the coating essentially lead free and environmentally friendly. The lead content, if any, is maintained at extremely low levels within the metallic coating. The amount of lead in the tin-zinc coating is maintained such that no more than 0.05 weight percent is present in the coating. Preferably, the lead content in the coating is maintained at levels less than 0.01 weight percent. The limiting of lead content in the metallic coating eliminates any concerns associated with the leaching of the lead from the metallic coating and the environmental concerns associated with products containing lead.

The tin-zinc metallic coating is a two-phase system which contains a large weight percentage of zinc. Preferably, the zinc weight percentage is at least 65% and can be as much as 85% of the tin-zinc coating. The tin content within the metallic coating essentially makes up the balance of the metallic coating. The zinc content ranges between 15–35 weight percent of the tin-zinc metallic coating. Preferably, the metallic coating includes 20 weight percent tin. The tin-zinc system forms a two-phase metallic coating. A two-phase system is defined as a metal alloy comprising two primary components. Surprisingly, the inventors have found that the tin-zinc coating provides a protective coating with a higher corrosion resistance as compared to a tin coating primarily made up of tin. The amount of zinc within the metallic coating is maintained so as not to exceed 85% so that the metallic coating remains relatively pliable for use in a press-fit roofing system. The inventors have discovered that the use of large weight percentages of zinc in the tin-zinc alloy does not cause the coating to be too rigid or brittle thus preventing the coated material to be formed or bent which results in a cracked coating. In application Ser. No. 042,649, the inventors, when first developing the novel tin-zinc coating, believed that zinc weight percentages above 30 weight percent would make the coating rigid and brittle which would result in the cracking of the tin-zinc coating when the coated material was bent or formed. Shortly after the filing of application Ser. No. 042,649, extensive experimentation was performed on tin-zinc coatings having a zinc content above 50 weight percent. Surprisingly, the inventors discovered that a tin-zinc coating containing 65–85 weight percent zinc and the balance tin produced an acceptably malleable metallic coating which resisted cracking when bent or formed. The inventors are of the belief that the unique characteristics of the two-phase metallic tin-zinc system somehow modifies the rigid characteristics of zinc to allow the tin-zinc coating to be malleable. In addition to the surprising malleability of the tin-zinc coating, the inventors discovered that the coating provides comparable corrosion resistance to tin-zinc coatings containing larger amounts of tin. Finally, the inventors discovered that the tin-zinc coating containing 65–85 weight percent zinc produced a colored coating which closely matched the gray, earth tone color of weathered terne. Besides terne coatings providing corrosion resistance, terne weathers over time and changes color to a gray, earth tone color. This color has become very popular with consumers; however, the color has been almost impossible until now to match unless the material was painted. The inventors have discovered that the high zinc tin-zinc coating changes to a color which very closely resembles the popular grey, earth tone color. The tin-zinc system of application Ser. No. 042,649 does change to a grey color; however, the grey shade is much different from the popular grey, earth tone which is associated with terne coatings.

The tin-zinc metallic coating may also contain small amounts of other metallic components which can be used to slightly modify the physical properties of the metallic coating. The metallic coating may contain bismuth and antimony to increase the strength of the metallic coating and also to inhibit the crystallization of the tin at lower temperatures. The amount of bismuth in the metallic coating may range between 0–1.7 weight percent and the amount of antimony may range between 0–7.5 weight percent of the coating. Preferably, antimony and/or bismuth are added to the metallic coating in an amount between 0.01–0.5 weight percent of the coating. This weight percentage amount is sufficient to prevent the tin from crystallizing at low temperatures which may result in the metallic coating flaking off the metallic roofing materials. It is believed that the high levels of zinc also help stabilize the tin within the coating. Antimony and/or bismuth in weight percentages greater than 0.5% are primarily added to harden and/or strengthen the metallic coating. Small amounts of other metals, such as iron or copper, may be added to the metallic coating to strengthen and/or increase the pliability of the metallic coating. These other types of metals typically constitute very small weight percentages within the metallic coating and generally do not exceed more than 2% of the metallic coating and preferably are less than 1% of the metallic coating.

The tin-zinc coating quickly forms a grey, earth tone color which closely resembles the color associated with weathered terne coatings. The grey surface is much less reflective than that of coatings of tin and/or non-weathered terne. The reduced reflective surface of the tin-zinc coating is important in that the coated building materials can be immediately used on facilities that require materials not to be highly reflective. Prior coatings such as tin and/or terne had to be weathered and/or additionally treated before such coated building materials could be used on facilities which prohibit the use of highly-reflective materials.

The tin-zinc coating can be applied to many types of metals. The two most popular metals are carbon steel and stainless steel. These two metals are preferably pretreated before coating to clean the material surface and remove oxides from the surface so that a strong bond is formed between the material and the tin-zinc coating. Stainless steel is a metal alloy containing iron and chromium. Stainless steel may also include nickel which can be impregnated within the stainless steel and/or flashed on the stainless steel surface, usually by electroplating. Carbon steel and other types of metals used as architectural material usually do not contain nickel. The inventors have discovered that if the architectural material is plated with a thin nickel layer prior to coating the material which the tin-zinc coating, the material exhibits improved corrosion resistance in acidic environments. If a nickel layer is to be applied, the nickel layer is preferably plated to the metallic building material by an electrolysis process. The thickness of the layer is maintained such that it preferably is not more than 3 microns (0.0003 in.) thick and preferably has a thickness which ranges between 1–3 microns. The bond between the tin-zinc coating and the nickel layer is surprisingly strong and durable and thereby inhibits the tin-zinc coating from flaking especially when the building materials are preformed or formed during installation. The plating of the building materials with the nickel layer is very desirable when the building materials are used in an environment which has high concentrations of fluorine, chlorine and other halogens. Although the tin-zinc coating significantly reduces the corrosive effects of halogens on the metallic building materials, the inventors have found that by placing a thin layer of plated nickel between the metallic building material and the tin-zinc coating, the corrosive effects of the halogens are even further reduced.

Examples of the tin-zinc, two-phase metallic coating which have exhibited the desired characteristics as mentioned above are set forth as follows:

| Alloy Ingredients | A | B | C |
|---|---|---|---|
| Tin | 15 | 20 | 30 |
| Antimony | ≦7.5 | ≦7.5 | ≦7.5 |
| Bismuth | ≦1.7 | ≦1.7 | ≦1.7 |
| Iron | ≦0.1 | ≦0.1 | ≦0.1 |
| Copper | ≦2.0 | ≦2.0 | ≦2.0 |
| Lead | <0.05 | <0.05 | <0.05 |
| Zinc | Bal. | Bal. | Bal. |

Generally, the formulations of the tin-zinc metallic coating include in weight percentage amounts; 65–85% zinc, 0–0.5% antimony, 0–0.5% bismuth, 15–35% tin and less than 0.01 lead.

The thickness of the tin-zinc coating may be varied depending upon the environment in which the architectural materials are to be used. The tin-zinc coating exhibits superior corrosive-resistant properties as compared to tin coatings. The metallic coating may be applied in a thickness between 0.001–0.05 in. Preferably, the coating thickness is applied by a hot-dip process and ranges between 0.001–0.002 in. Such a coating thickness has been found to be adequate to prevent and/or significantly reduce the corrosion of the metallic architectural materials in virtually all types of environments. Coatings having thicknesses greater than 0.002 can be used in harsh environments to provide added corrosion protection.

The tin-zinc coating can be welded with standard lead solders and no-lead solders. Preferably, no-lead solders are used to avoid concerns associated with the use of lead.

The invention has been described with reference to the preferred and alternate embodiments. Modifications and alterations will become apparent to those skilled in the art upon the reading and understanding of the details discussed in the detailed discussion of the invention provided for herein. This invention is intended to include all such modifications and alterations insofar as they come within the scope of the present invention.

Having defined the invention, the following is claimed:

1. A metal strip unwound from a roll of strip and coated in a continuous hot dip process forming a coating with a highly corrosive-resistant, two phase tin-zinc colored metallic coating, said coating comprising at least 65 weight percent zinc, at least 15 weight percent tin and at least 0.01 weight percent metallic stabilizer wherein said stabilizer is a metal selected from the group consisting of bismuth, antimony and mixtures thereof.

2. A coated metal strip as defined in claim 1, wherein said weight percent of said metal stabilizer is up to 9.2 weight percent.

3. A coated metal strip as defined in claim 2, wherein said metal additive includes 0.01–2.0 weight percent copper.

4. A coated metal strip as defined in claim 1, wherein said alloy contains lead.

5. A coated metal strip as defined in claim 4, wherein said lead content is less than 0.01 weight percent.

6. A coated metal strip as defined in claim 1, wherein said base metal strip is coated with a thin nickel layer prior to applying said alloy coating.

7. A coated metal strip as defined in claim 6, wherein said nickel layer has a thickness up to 3 microns.

8. A coated metal strip as defined in claim 1, wherein said metal strip is stainless steel.

9. A coated metal strip including a base strip of steel or copper with parallel surfaces both of which are coated with a highly corrosive-resistant, homogeneous two-phase tin-zinc alloy with zinc being the primary constituent and tin forming one of said two-phases, said coating being applied by continuously passing the continuous metal strip through a bath of molten tin-zinc alloy at a speed to deposit onto said base strip an impervious two-phase layer of said tin-zinc alloy having a uniform thickness on both surfaces in the range of 0.001–0.05 inch, said two-phase tin-zinc alloy coating comprising discrete sections of zinc in a tin rich matrix, said two-phases being formed by proportioning the zinc and tin to provide a majority by weight zinc and over 15 percent by weight tin with 0.01–11.25 percent by weight of said coating alloy being one or more metals additive, which additive does not change the two-phase characteristic of said coating alloy deposited on the moving strip wherein said metal additives are selected from the group consisting of antimony, bismuth, copper, iron and mixtures thereof.

10. A coated metal strip as defined in claim 9, wherein said weight percent of said metal additive is up to 2.0 weight percent.

11. A coated metal strip as defined in claim 9, wherein said zinc content is 65–85 weight percent and said tin content is 15–35 weight percent.

12. A coated metal strip as defined in claim 9, wherein said alloy includes at least 0.01 weight percent metal stabilizer selected from the group consisting of antimony, bismuth and mixtures thereof.

13. A coated metal strip as defined in claim 9, wherein said coating thickness is 0.001 to 0.002.

14. A coated metal strip as defined in claim 9, wherein said alloy contains lead.

15. A coated metal strip as defined in claim 14, wherein said lead content is less than 0.01 weight percent.

16. A coated metal strip as defined in claim 9, wherein said base metal strip is coated with a thin nickel layer prior to applying said alloy coating.

17. A coated metal strip as defined in claim 16, wherein said nickel layer has a thickness up to 3 microns.

18. A coated metal strip as defined in claim 16, wherein said nickel layer is coated by an electroplating process.

19. A coated metal strip including a base strip of steel or copper with parallel surfaces both of which are coated with a highly corrosive-resistant, homogeneous two-phase tin-zinc alloy with zinc being the majority constituent and tin forming at least 15 weight percent of said two-phases, said coating being applied by continuously passing the continuous metal strip through a bath of molten tin-zinc alloy at a speed to deposit onto said base strip an impervious two-phase layer of said tin-zinc alloy having a uniform thickness on both surfaces in the range of 0.001–0.05 inch, said two-phase tin-zinc alloy coating comprising a majority of zinc and formed by discrete sections of zinc in a tin rich matrix, and wherein said base strip is plated with a thin layer of metal prior to applying said two-phase metallic coating, wherein said two-phase coating alloy includes 0.01–2.0 weight percent metal additive selected from the group consisting of antimony, bismuth, copper, iron and mixtures thereof.

20. A coated steel strip as defined in claim 19, wherein said metal layer is nickel.

21. A coated metal strip as defined in claim 19, wherein said metal layer thickness is up to 3 microns.

22. A coated metal strip as defined in claim 19, wherein said metal layer is electroplated onto said metal strip.

23. A coated metal strip as defined in claim 19, wherein said two-phase coating alloy includes lead.

24. A coated metal strip as defined in claim 19, wherein said steel is stainless steel.

25. A coated metal strip as defined in claim 19, wherein said zinc content is 65–85 weight percent and said tin content is 15–35 weight percent.

26. A coated metal strip as defined in claim 19, wherein said metal additive includes 0.01–2.0 weight percent copper.

27. A coated metal strip including a base strip of stainless steel with parallel surfaces both of Which are coated with a highly corrosive-resistant, homogeneous two-phase tin-zinc alloy, said coating being applied by continuously passing the continuous metal strip through a bath of molten tin-zinc alloy at a speed to deposit onto said base strip an impervious two-phase layer of said tin-zinc alloy having a uniform thickness on both surfaces in the range of 0.001–0.05 inch, said two-phase tin-zinc alloy coating comprising a majority of zinc and at least 15 weight percent tin and formed of discrete sections of zinc in a tin matrix, wherein said two-phase coating alloy includes 0.01–2.0 weight percent metal additive selected from the group consisting of antimony, bismuth, cooper iron and mixtures thereof.

28. A coated metal strip as defined in claim 27, wherein said strip includes chromium.

29. A coated metal strip as defined in claim 27, wherein said strip includes nickel.

30. A coated metal strip as defined in claim 28, wherein said strip includes nickel.

31. A coated material strip including a base strip of stainless steel with parallel surfaces both of which are coated with a highly corrosive-resistant, homogeneous two-phase tin-zinc alloy, said coating being applied by continuously passing the continuous metal strip through a bath of molten tin-zinc alloy at a speed to deposit onto said base strip an impervious two-phase layer of said tin-zinc alloy having a uniform thickness on both surfaces in the range of 0.001–0.05 inch, said two-phase tin-zinc alloy coating comprising a majority of zinc and at least 15 weight percent tin and formed of discrete sections of zinc in a tin matrix, wherein said alloy includes 0.01–2.0 weight percent cooper.

\* \* \* \* \*

Disclaimer 5,470,667—Jay F. Carey, II, Follansbee, W. Va.; Mehrooz Zamanadeh, Pittsburgh, Pa. COATED METAL STRIP. Patent dated November 28, 1995. Disclaimer filed June 4, 2002 by the assignee, The Louis Berkman Company.

The term of this patent shall not extend beyond the expiration date of Pat. No. 5,455,122.
*(Official Gazette, August 20, 2002)*

UNITED STATES PATENT AND TRADEMARK OFFICE
CERTIFICATE OF CORRECTION

PATENT NO.    : 5,470,667
DATED         : November 28, 1995
INVENTOR(S)   : Carey, II et al.

It is certified that error appears in the above-identified patent and that said Letters Patent is hereby corrected as shown below:

Column 7,
Line 58, "(0.0003 in.)" should read -- (0.003 mm) --.

Signed and Sealed this

Eighteenth Day of February, 2003

JAMES E. ROGAN
*Director of the United States Patent and Trademark Office*